Oct. 29, 1963    J. N. DYER ETAL    3,108,469
NON-CONTACTING ULTRASONIC GAGE
Filed Aug. 4, 1959    2 Sheets-Sheet 1
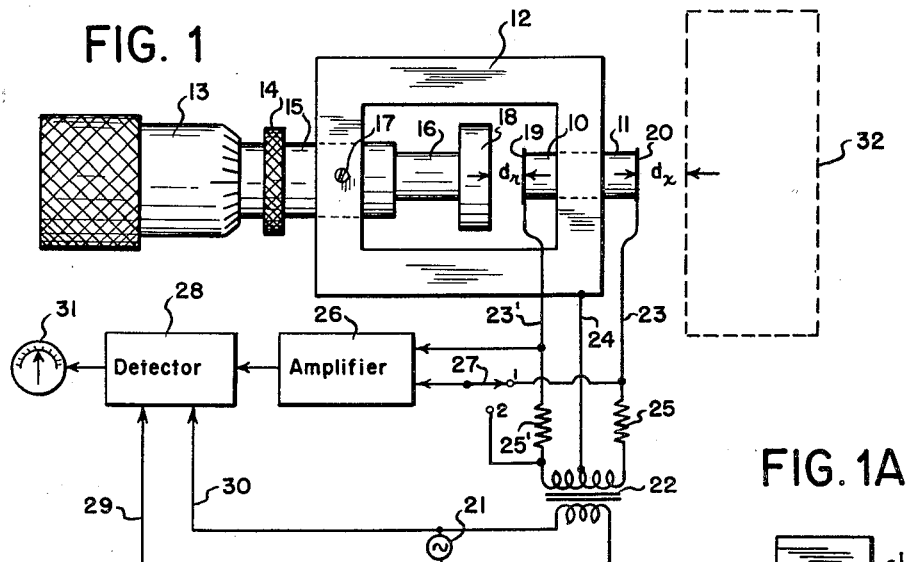
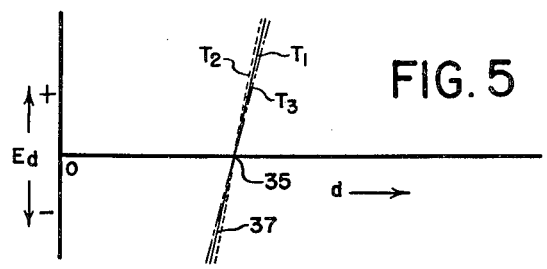
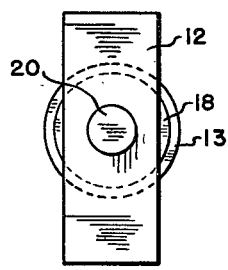
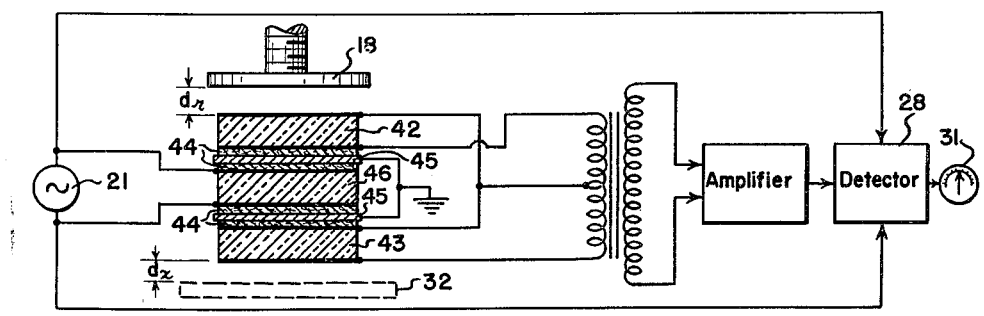
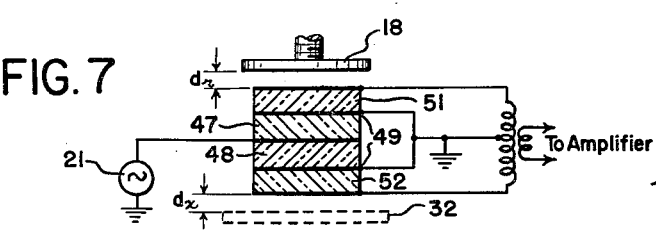
INVENTORS
JOHN N. DYER
BY MARTIN RUDERFER
ATTORNEYS … # 3,108,469
NON-CONTACTING ULTRASONIC GAGE
John N. Dyer, Oyster Bay Cove, and Martin Ruderfer, Brooklyn, N.Y., assignors to Cutler-Hammer, Inc., Milwaukee, Wis., a corporation of Delaware
Filed Aug. 4, 1959, Ser. No. 831,528
10 Claims. (Cl. 73—67.1)

This invention relates broadly to non-contacting gages, and particularly to gages utilizing ultrasonic energy reflected from the surface to be gaged to measure the distance thereto.

In many aspects of industrial manufacturing and the like there exists a great need for making precise measurements where it is impossible or undesirable, for one reason or another, to establish actual physical contact with the part surface to be measured. Non-contacting air gages, which have been widely used in industry, suffer from a major shortcoming in that the measurement varies as a function of ambient temperature, humidity, etc. as well as with air supply pressure. Consequently changes in gage calibration can be expected to occur with changes in the aforementioned operating conditions.

Ultrasonic interferometers have been used in laboratories for the measurement of certain acoustic characteristics of gas, including velocity of propagation. However, the apparatus known and used in this field has been temperature sensitive and consequently has not bene used in industry for gaging purposes.

As a practical matter there is also need for a non-contacting gage which can be operated from a readily available source of energizing power such as batteries or ordinary A.-C. electric power, as opposed to the regulated compressed air supplies required for air gages.

It is accordingly a primary purpose of this invention to provide an ultrasonic non-contacting gage which is electrically energizable, and has a high degree of measuring accuracy substantially independent of temperature and other ambient conditions.

The basic laboratory ultrasonic interferometer relies for sensing purposes upon the change of impedance of a piezoelectric crystal with changes in the acoustical loading thereon. The crystal, operating as an electromechanical transducer, is maintained in forced vibration by an independent continuous-wave oscillator, and generates compressional ultrasonic waves in the gaseous medium in contact therewith. A reflecting plate is disposed opposite and parallel to a vibrating face of the crystal, and standing waves are set up therebetween. As the reflecting plate is made to approach or recede from the crystal face, cyclical changes of phase and amplitude of the waves occur.

Reaction of the reflected ultrasonic waves upon the crystal transducer is manifested by a measurable change in crystal impedance and in motional-current flow therethrough, corresponding to changes in the acoustic loading. The effective loading on the crystal varies as a function of the amplitude and phase of the reflected ultrasonic waves and since the phase of the waves is periodic or repetitive in space, so too is the plot of crystal current or impedance as a function of total path-length between the transducer and the reflecting plate. Generally current minima and impedance maxima are observed as the separation of crystal and reflector is changed by half-wavelength distances.

The velocity of propagation of the ultrasonic waves in the gaseous medium is equal to the product of the frequency and the wavelength thereof. Commonly the interferometer is employed to measure velocity of propagation of ultrasonic waves. The wavelength is determined by measuring the change in separation of crystal and reflector between successive current minima or impedance maxima, and the wavelength is then multiplied by the frequency. Attenuation can also be determined by measuring changes in these minima or maxima as a function of the separation of crystal and reflector.

This invention is concerned with the employment of the basic interferometer principle in a non-contacting gage which is capable of measuring distances with a high degree of accuracy. If the velocity of propagation and frequency are known, it is possible to measure distances by apparatus similar to present interferometers. Unfortunately the velocity of propagation varies considerably with ambient conditions. Changes in temperature are particularly important, since the velocity in air varies approximately proportionately with the square root of the temperature in degrees Kelvin. This would seriously affect the accuracy and render the instrument of doubtful usefulness in an industrial environment.

In accordance with one embodiment of this invention, two ultrasonic transducers, preferably substantially identical crystals, are maintained in forced vibration by a common energizing oscillator, with one crystal (reference) being adapted to radiate ultrasonic energy towards an adjustable distance-calibrated reference reflector plate and the other (measuring) towards the surface to be gaged. Currents flowing through the separate crystals are differentially compared and measured by a detection circuit. Since the ambient conditions may be maintained substantially the same for both crystals and for the respective air-paths, this arrangement substantially compensates for temperature and other ambient changes.

The distance to the surface to be gaged may be determined by adjusting the reference plate until the differential output is a minimum, ideally zero, and then reading the calibrated scale. Preferably, however, the difference between the crystal currents is measured by a phase-sensitive detector. With such an arrangement the reference reflector plate is advantageously located at or near an intgeral number of half-wavelengths (total path equals integral number of full wavelengths) from the reference crystal corresponding approximately to the distance between the measuring crystal and the part to be gaged. A meter connected to the detector then indicates the difference between the reference distance and the distance to be measured.

In practice, gages may be employed to determine absolute distance in, say, inches and decimal parts thereof. Or, they may be employed to insure that a dimension, once established, is repeatedly indicated with accuracy even though the absolute value of the dimension is not required. The latter is particularly important in machine tool operations. Either distance measuring technique may be employed for absolute measurements, but the second technique is advantageous for control purpose since particular values of the detector output may be employed for control purposes, without readjusting the reflector plate position.

In further embodiments of the invention special multiple crystal transducers are employed wherein the respective measuring and reference crystals are mechanically sandwiched to the opposite faces of a driving crystal or pair of crystals.

Although the crystal transducers employed in the ultrasonic gage provided by this invention are ordinarily operated at a common fundamental resonant frequency, they may also be operated in concert on harmonic frequencies, particularly odd harmonics. This feature affords a convenient means for resolving an unknown distance in terms of a wide choice of ultrasonic wavelengths.

The invention can further be understood by referring to the following description of specific embodiments thereof. In the drawings:

FIG. 1 shows a mechanical embodiment of the invention combined with a schematic diagram of the associated electrical circuits;

FIG. 1A is an end view of the embodiment of FIG. 1;

FIG. 5 is a graph illustrating the measuring characteristics of an ultrasonic gage in accordance with the invention; and FIGS. 6 and 7 show embodiments employing unique multiple crystal transducers.

Figure 2:
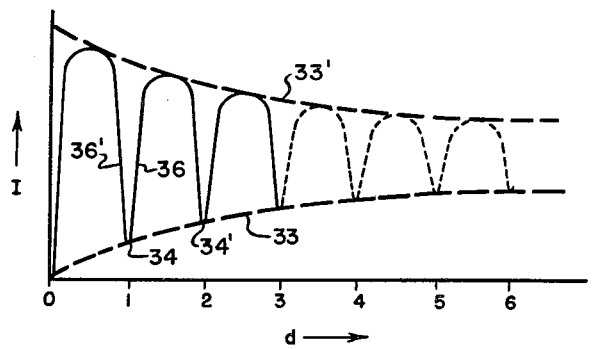
FIG. 2 shows a graph of current flow through a driven crystal transducer plotted as a function of distance between the crystal and an adjacent reflecting surface.

Referring to FIG. 1, the non-contacting ultrasonic gage shown therein comprises a reference crystal transducer 10 and a measuring crystal transducer 11 mounted on a supporting metal frame 12. A standard micrometer head including a partly knurled thimble and sleeve 13, a lock nut 14, barrel 15 and spindle 16 is mounted in frame 12 and secured by set screw 17. A reflecting plate 18 is mounted on the micrometer spindle opposite reference crystal 10 at an adjustable reference distance $d_r$.

On the outer surfaes of the crystals are electrically conductive films 19 and 20 to which ultrasonic oscillator 21 is connected via centertapped transformer 22 and conductors 23, 23′. The center tap is connected to frame 12 by conductor 24 to complete the energizing circuits for the crystals. The inner surfaces of the crystals, in contact with frame 12, may also be provided with conductive films.

Resistors 25, 25′ are connected in series with conductors 23 and 23′ respectively in order to measure current flow through the separate crystals. These resistors are advantageously chosen to be of relatively low value compared to the resistance of the crystals at the resonant operating frequency. One input to amplifier 26 is connected directly to conductor 23′ while the other input is connected to the switch arm of a single-pole double-throw switch 27. Thus when switch 27 is thrown to position 2, the voltage drop developed across resistor 25′ is supplied to amplifier 26, and when the switch is thrown to position 1, the voltage difference appearing between the two resistors is supplied to the amplifier.

Detector 28 is provided to measure the output voltage of amplifier 26. This detector is advantageously of the phase-sensitive or synchronous type, and obtains a reference voltage from oscillator 21 through conductors 29, 30. The D.-C. output voltage of detector 28 is connected to indicator meter 31 which may be calibrated arbitrarily or in units of distance. Operation of the gage in measuring the unknown distance $d_x$ between part 32 and crystal surface 20 will be described more fully below.

FIG. 2 shows graphically the cyclical change in current through a driven crystal with change of distance between the crystal and a reflecting surface. Curves showing changes in the impedance of the crystal are similar but inverted. These changes are introduced in the crystal due to the cyclical change in acoustic loading impressed upon the crystal by the reflected ultrasonic energy impinging on the crystal face. The distance $d$ is plotted in integral units of $\lambda/2$ where $\lambda$ is the wavelength of the ultrasonic wave. "I" represents crystal current. It will be noted that the crystal characteristic is substantially linear for an appreciable range of distances in either direction about each current minimum 34, 34′, etc.

The present invention utilizes this characteristic for sensing purposes to provide a non-contacting ultrasonic gage which is capable of measuring extremely small increments of distance. Since the characteristic is periodic in integral half-wavelength units, it follows that distance resolution is enhanced by increasing the operating frequency. The operating frequency may be selected to meet the needs of the user, for example, several hundred kilocycles and upward into the megacycle range.

Figure 3:
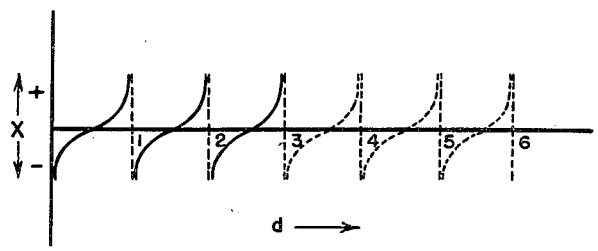
FIG. 3 is a graph of the reactance characteristic of a driven crystal transducer plotted as a function of distance between the crystal and an adjacent reflecting surface.

The graph of FIG. 3 shows a plot of the electrical reactance introduced into the vibrating crystal as a result of the cyclical acoustic loading described above in connection with FIG. 2. Distance $d$ is plotted in integral units of $\lambda/2$, and $x$ represents units of inductive and capacitive electrical reactance. It will be noted that the reactance changes sign each half-wavelength corresponding to current nulls in FIG. 2.

Figure 4:
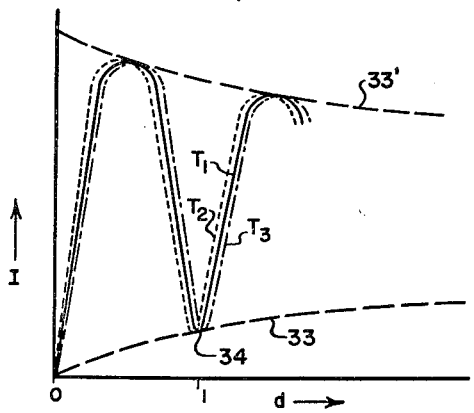
FIG. 4 is a fragmentary graph similar to FIG. 2 but somewhat expanded, and showing curves of crystal current for three different temperatures.

FIG. 4 is an expanded fragmentary graph similar to FIG. 2 showing generarally the effect of temperature change on the crystal current. It will be recalled that the wavelength $\lambda$ of the ultrasonic waves in space can be computed from the well-known equation $\lambda = c/f$, where $c$ is the velocity of propagation of the energy and $f$ is the frequency. Since $c$ varies approximately as the square root of the absolute gas (air) temperature, it follows that the wavelength in space must also vary when the frequency remains constant. The curves of FIG. 4 show graphically the effect of temperature change on wavelength for an intermediate temperature $T_1$, a higher temperature $T_3$ and a lower temperature $T_2$. It should be noted that the three curves are similar in shape and size but that the peaks and valleys are shifted with respect to the horizontal "$d$" axis. Consequently, at a given distance along the "$d$" axis the crystal current will change markedly as the temperature changes.

It is therefore apparent that if a single crystal were employed as in the conventional interferometer, the crystal output would vary markedly with temperature changes, even though the distance to the reflecting surface were the same. In such an arrangement a further source of error would also be present, which may be material under some conditions. The envelopes of the waves shown by dash lines 33, 33′ show the attenuation in the wave as a function of distance. If the changes in the ambient conditions introduce more or less attenuation, the magnitude of the current at, for example, the null region 34 will change even though the distance remains unchanged.

The gage shown in FIG. 1 largely eliminates these errors due to changes in temperature and other ambient conditions by utilizing a reference crystal and reflecting surface, and by differentially comparing the reference crystal ouput with the measuring crystal output. Advantageously, a phase-sensitive detector is employed in the differential comparison, so that outputs of opposite polarity are obtained when the measuring crystal current changes from in-phase to out-of-phase with respect to the reference crystal current.

To describe the operation, assume first that the distance $d_x$ in FIG. 1 is equal to the reference distance $d_r$, and the crystals are identical. Equal currents will pass through resistors 25 and 25′ and the output of detector 28 will be zero. This will be true whether the particular distance corresponds to a null, such as shown at 34 in FIG. 2, or to some other point on the curve. If, then, the ambient conditions change, the currents in the two crystals will change by like amounts since the reference path is exposed to the same ambient change as the measuring path. Consequently, no error will result.

This situation corresponds to point 35 in FIG. 5. In this figure the output of the detector 28 is plotted for small variations in distance in the vicinity of a null region where current varies substantially linearly with distance.

If the unknown distance $d_x$ is greater or less than the reference distance, the currents in the two crystals will differ. If the reference distance is initially set at a null, such as shown at 34 in FIG. 2, somewhat greater distances for $d_x$ will give outputs from measuring crystal 11 along the portion 36 of the curve, and somewhat smaller distances will give outputs along portion 36′. The phase of the current in crystal 11 changes rapidly in going through the null, and will be substantially opposite for 36 and 36'. Accordingly, the output of the phase-sensitive detector 28 will be of opposite polarity on opposite sides of the null, as shown by line 37 in FIG. 5.

If the reference distance is somewhat away from a null, say partway up portion 36 of the curve of FIG. 2, zero output from the detector will be obtained when the unknown distance equals the reference distance. For a somewhat greater unknown distance, the output of crystal 11 will be greater and positive output will be obtained from detector 28. If the unknown distance is less a negative output will be obtained.

If the ambient conditions change, the outputs of the crystals will change, but the operation will be substantially the same. The operation of the crystals may shift from $T_2$ to $T_1$, or to $T_3$ of FIG. 4, as the case may be. Zero output from the detector will be obtained when the unknown distance equals the reference distance, regardless of which curve applies. Also, since each curve is substantially linear on opposite sides of its null, the detector output will vary substantially linearly with distance over a substantial range.

The slopes of the steep portions of the curves $T_1$–$T_3$ may be slightly different and accordingly the slope of the detector output may change slightly. This is shown in FIG. 5. The difference in slopes is exaggerated for clarity. The consequent small error in measurement under different ambient conditions will ordinarily be unimportant in practice.

The gage of FIG. 1 can be used in different manners as meets the operating requirements. For manual gaging of distance the switch 27 may be placed in position 1 as shown, and the micrometer adjusted to give a zero indication on meter 31. The micrometer reading then gives the distance $d_x$, since this equals $d_r$. If the crystals are not perfectly balanced, suitable compensations may be introduced in the circuit, as by adjustment of resistors 25, 25'. Preferably measurements are taken with the reference distance near multiples (including one) of half-wavelengths, for greatest accuracy. A possible ambiguity may arise since zero readings will repeat each half-wavelength change in the reference distance. Coarse measurements may be made by other means to resolve the ambiguity, where necessary.

Another manner of using the gage is to set the micrometer so that the reference distance is a half-wavelength or multiple thereof at the operating frequency. This may be readily accomplished by adjusting the micrometer to approximately the correct position, moving switch 27 to position 2, and further adjusting the micrometer for a minimum reading on meter 31. This establishes the operation of reference crystal 10 at a current null, as shown in FIG. 2. Then unknown distances near the reference distance can be read on meter 31, with suitable meter calibration.

For gaging departures from a given standard, the gage can be initially located and adjusted to give a meter reading at or near zero for the selected standard. Thereafter departures from the standard in either direction can be read from the meter.

For many purposes, particularly in the control of machine tools, it is desired to insure that a movement is repeated accurately, and the actual measurement need not be ascertained. For such uses the gage may be adjusted as just described, with the reference distance at a multiple of a half-wavelength, and the gage mounted so that the unknown distance gives a desired indication on meter 31. On subsequent movements, the meter indicates when the same relationship has been reached. If desired, relay means may be actuated by the detector output to control the machine tool, etc. If it is then desired to effect control at a slightly different point, the micrometer can be adjusted to change the meter reading by the desired amount, with the unknown distance kept constant during adjustment.

Other ways of using the gage are possible, as meets the requirements of the gaging situation.

Referring now to FIG. 6, a modification is shown in which the reference and measuring crystals are driven by a third crystal sandwiched therebetween. Here the ultrasonic oscillator 21 is connected to drive a crystal transducer 46. A reference crystal transducer 42 is mechanically coupled to one face of crystal 46 and a substantially identical measuring crystal transducer 43 is mechanically coupled to the other face of crystal 46. Crystals 42 and 43 are electrically insulated from the center driving crystal by insulator sheets 44 and grounded shields 45. Crystals 42 and 43 are maintained in forced synchronous vibration by driven crystal 46.

This embodiment of the invention operates in much the same manner as the gage shown in FIG. 1. However, inasmuch as the crystals are electrically isolated, it is possible to compare voltages directly, rather than inserting resistors to convert currents to voltages. Thus the voltages developed across the measuring crystal 43 and the reference crystal 42 are compared differentially and measured by the phase-sensitive detector 28. This embodiment has further advantages in that isolation is provided between the ultra-sonic driving current and the reference and measuring crystal circuits, hence making it possible to operate the transducers satisfactorily with lower signal levels.

A four-crystal transducer is shown in FIG. 7. The sandwich arrangement employed in this embodiment is similar to the three-crystal arrangement shown in FIG. 6. However the insulation strips have been eliminated to afford improved mechanical coupling between the transducers. Two substantially identical driving crystals 47, 48 are maintained in forced vibration by oscillator 21. The outside conductive films or platings 49 on these driving crystals are returned to ground, providing effective electrical isolation between the electrically driven crystals and the mechanically driven crystals 51 and 52. This enables one side of generator 21 to be grounded. The voltages developed across crystal 51 (reference) and crystal 52 (measuring) are differentially compared and measured by a phase-sensitive detector and the measurement error due to ambient temperature change is substantially removed as described above.

In the embodiments of FIGS. 6 and 7, the reference and measuring crystals are preferably identical, but the driving crystal or crystals may be different. This provides a desirable flexibility in design, such as employing very sensitive crystals for the outer elements and selecting the inner crystal or crystals in view of driving requirements and cost considerations.

As a practical matter the crystal transducers used in this invention are advantageously operated at their fundamental resonant frequency in order to achieve optimum measuring sensitivity. In certain instances, however, it may be advantageous to operate the crystal transducers at selected harmonics of the fundamental crystal frequency. This feature of the invention affords a convenient means for resolving unkown distances in terms of a wide choice of harmonically related wavelengths and may be useful in initially determining the unknown distance $d_x$ to be gaged and particularly in establishing the number of half-wavelengths from which the measurement is to commence. In the event that the crystals are not identical, suitable compensations in the circuitry may be provided.

For some applications it may not be convenient to locate the gage at a distance from the surface to be gaged which is approximately a multiple of half-wavelengths. In such case the operating frequency may be changed so as to change the wavelength. It may also be desirable to change the resonant frequency of the crystals by reactive elements introduced in the crystal circuits in known manner.

Several preferred embodiments of the invention have been described. Various modifications may be made within the scope of the invention. For example, in certain instances the user might find it advantageous to replace the phase-sensitive detector described above with a simpler detector which is sensitive to amplitude changes only. The user might also occasionally find it propitious to operate the crystal transducers on frequencies intermediate the resonant fundamental and the odd harmonics in spite of the attendant loss in measuring sensitivity. Other changes and variations in the mode of operation may be made within the scope of the invention as set forth in the appended claims.

We claim:

1. A non-contacting ultrasonic gage which comprises a first ultrasonic transducer for continuously radiating ultrasonic energy towards a reflecting surface to be gaged, a reference reflecting surface, a second ultrasonic transducer positioned to continuously radiate ultrasonic energy towards said reference surface, a source of continuous alternating waves for driving said transducers at an ultrasonic frequency, said transducers yielding electrical responses varying with the acoustic loadings thereon produced by reflections of the ultrasonic energy from the surface to be gaged and the reference surface respectively, means for differentially comparing said electrical responses of the transducers to produce a differential response, and means for indicating said differential response.

2. A non-contacting ultrasonic gage which comprises a first ultrasonic transducer for continuously radiating ultrasonic energy towards a reflecting surface to be gaged, a reference reflecting surface, a second ultrasonic transducer positioned to continuously radiate ultrasonic energy towards said reference surface, a source of continuous alternating waves for simultaneously driving said transducers at an ultrasonic frequency, said transducers yielding electrical responses varying with the acoustic loading thereon produced by reflections of the ultrasonic energy from the surface to be gaged and the reference surface respectively, means for differentially comparing said electrical responses of the transducers to produce a differential response, detector and indicating means supplied with said differential response, and means for adjusting the distance between said reference surface and said second transducer.

3. A non-contacting ultrasonic gage in accordance with claim 2 in which said detector in phase-sensitive and supplied with a reference signal from said common source.

4. A non-contacting ultrasonic gage which comprises a support structure, a first crystal transducer mounted on said support structure for continuously radiating ultrasonic energy towards a reflecting surface to be gaged, a reference reflecting surface mounted on said support structure, a second crystal transducer mounted on said support structure and positioned to continuously radiate ultrasonic energy towards said reference surface, a source of continuous alternating waves for simultaneously driving said transducers at an ultrasonic frequency, said transducers yielding electrical responses varying with the acoustic loading thereon produced by reflections of the ultrasonic energy from the surface to be gaged and the reference surface respectively, means for differentially comparing said electrical responses of the transducers to produce a differential response, detector and indicating means supplied with said differential response, and means for adjusting the distance between said reference surface and said second transducer.

5. A non-contacting ultrasonic gage which comprises a support structure, a first crystal transducer mounted on said support structure for continuously radiating ultrasonic energy towards a reflecting surface to be gaged, a reference reflecting surface mounted on said support structure, a second crystal transducer mounted on said support structure and positioned to continuously radiate ultrasonic energy towards said reference surface, means for supplying continuous wave electrical oscillations from an A.-C. source simultaneously to said transducers to energize the same, said transducers yielding electrical responses varying with the acoustic loading thereon produced by reflections of the ultrasonic energy from the surface to be gaged and the reference surface respectively, means for differentially comparing the currents in said transducers to produce a differential signal proportional to the difference therebetween, a phase-sensitive detector supplied with said differential signal and with a reference signal from said A.-C. source, indicating means supplied with the output of said detector, and calibrated means for adjusting the distance between said reference surface and said second transducer.

6. A non-contacting gage in accordance with claim 5 in which the first and second crystal transducers are substantially identical and the frequency of the oscillations from the A.-C. source is substantially equal to the resonant frequency of the transducers.

7. A non-contacting ultrasonic gage which comprises a driving crystal transducer, a pair of similar driven crystal transducers mechanically coupled to said driving crystal transducer, means for supplying continuous electrical oscillations from an A.-C. source to said driving transducer to energize the same and drive said driven transducers, one of said driven transducers being positioned to continuously radiate ultrasonic energy towards a reflecting surface to be gaged, a reference reflecting surface, the other of said driven transducers being positioned to continuously radiate ultrasonic energy towards said reference surface, said driven transducers yielding electrical responses varying with the acoustic loading thereon produced by reflections of the ultrasonic energy from the surface to be gaged and the reference surface respectively, means for differentially comparing said electrical responses of the driven transducers to produce a differential signal proportional to the difference therebetween, and indicating means responsive to said differential signal.

8. A non-contacting ultrasonic gage which comprises a driving crystal transducer, a pair of similar driven crystal transducers positioned on opposite sides of said driving transducer, said driven transducers being mechanically coupled to the driving transducer to be driven thereby but electrically insulated therefrom, means for supplying continuous electrical oscillations from an A.-C. source to said driving transducer to energize the same and drive said driven transducers, one of said driven transducers being positioned to continuously radiate ultrasonic energy towards a reflecting surface to be gaged, a reference reflecting surface, the other of said driven transducers being positioned to continuously radiate ultrasonic energy towards said reference surface, said driven transducers yielding electrical responses varying with the acoustic loading thereon produced by reflections of the ultrasonic energy from the surface to be gaged and the reference surface respectively, means for differentially comparing said electrical responses of the driven transducers to produce a differential signal proportional to the difference therebetween, indicating means responsive to said differential signal, and means for adjusting the distance between said reference surface and said other driven transducer.

9. A non-contacting ultrasonic gage which comprises a pair of driving crystal transducers arranged with opposed inner faces, a pair of driven crystal transducers positioned on opposite sides of said pair of driving transducers, each driven transducer being mechanically coupled to the outer face of the driving transducer adjacent thereto, means for supplying continuous electrical oscillations from an A.-C. source to said driving transducers to energize the same and drive said driven transducers, one of said driven transducers being positioned to continuously radiate ultrasonic energy towards a reflecting surface to be gaged, a reference reflecting surface, the other of said driven transducers being positioned to continuously radiate ultrasonic energy towards said reference surface, said driven transducers yielding electrical responses varying with the acoustic loading thereon produced by reflections of the ultrasonic energy from the surface to be gaged and the reference surface respectively, means for differentially comparing said electrical responses of the driven transducers to produce a differential signal proportional to the difference therebetween, and indicating means responsive to said differential signal.

10. A non-contacting ultrasonic gage which comprises a pair of driving crystal transducers arranged with opposed inner faces in contact, a pair of driven crystal transducers positioned on opposite sides of said pair of driving transducers, each driven transducer having a face in contact with the outer face of the driving transducer adjacent thereto, means for applying continuous electrical oscillations from an A.-C. source between inner and outer faces of said driving transducers to energize the same and drive said driven transducers, one of said driven transducers being positioned to continuously radiate ultrasonic energy towards a reflecting surface to be gaged, a reference reflecting surface, the other of said driven transducers being positioned to continuously radiate ultrasonic energy towards said reference surface, said driven transducers yielding electrical responses varying with the acoustic loading thereon produced by reflections of the ultrasonic energy from the surface to be gaged and the reference surface respectively, means for differentially comparing the said electrical responses of the driven transducers to produce a differential signal proportional to the difference therebetween, a phase-sensitive detector supplied with said differential signal and with a reference signal from said A.-C. source, indicating means supplied with the output of said detector, and means for adjusting the distance between said reference surface and said other driven transducer.

References Cited in the file of this patent

UNITED STATES PATENTS

| | | |
|---|---|---|
| 1,816,917 | Smythe et al. | Aug. 4, 1931 |
| 2,031,951 | Hartley | Feb. 25, 1936 |
| 2,394,461 | Mason | Feb. 5, 1946 |
| 2,618,968 | McConnell | Nov. 25, 1952 |
| 2,661,714 | Greenwood et al. | Dec. 8, 1953 |
| 2,921,466 | Nerwin | Jan. 19, 1960 |
| 2,985,018 | Williams | May 23, 1961 |
| 3,040,562 | Fitzgerald et al. | June 26, 1962 |

FOREIGN PATENTS

| | | |
|---|---|---|
| 547,109 | Italy | Aug. 10, 1956 |
| 805,544 | Great Britain | Dec. 10, 1958 |

OTHER REFERENCES

Article from "Microtecnic," vol. II, No. 6, pages 271–274.